United States Patent [19]
Ueda et al.

[11] Patent Number: 5,820,510
[45] Date of Patent: Oct. 13, 1998

[54] TOROIDAL CONTINUOUSLY VARIABLE TRANSMISSION

[75] Inventors: Kazuhiko Ueda; Hiromasa Yoshida; Hidenao Takedomi, all of Hiroshima, Japan

[73] Assignee: Mazda Motor Corporation, Hiroshima, Japan

[21] Appl. No.: 724,600

[22] Filed: Sep. 30, 1996

[30] Foreign Application Priority Data

Sep. 29, 1995 [JP] Japan .................................. 7-252749

[51] Int. Cl.$^6$ .............................. F16H 37/08; F16H 15/38
[52] U.S. Cl. .......................... 475/214; 475/215; 476/40; 476/42
[58] Field of Search .................................. 475/207, 214, 475/215, 216; 476/40, 42

[56] References Cited

U.S. PATENT DOCUMENTS

| | | | |
|---|---|---|---|
| 4,382,188 | 5/1983 | Cronin | 475/216 X |
| 5,372,555 | 12/1994 | Hibi | 476/42 |
| 5,607,372 | 3/1997 | Lohr | 475/216 |

FOREIGN PATENT DOCUMENTS 62-258259  11/1987  Japan .

OTHER PUBLICATIONS

Patent Abstracts of Japan, vol. 96, No. 10, Publication No: JP 08 159229, Jun. 21, 1996.
Patent Abstracts of Japan, vol. 11, No. 327, Publication No: JP 62 110071, May 21, 1987.
"Variable Car Transmission Betters Gears by Control", vol. 13, No. 1, Eureka Inc. Engineering Materials and Design, Jan. 1993.

*Primary Examiner*—Allan D. Herrmann
*Attorney, Agent, or Firm*—Sixbey, Friedman, Leedom & Ferguson, PC; Gerald J. Ferguson, Jr.; Donald R. Studebaker

[57] ABSTRACT

A continuously variable transmission of a type having a toroidal transmission unit mounted for rotation on a engine torque input shaft and a planetary gear mechanism mounted on an output shaft in parallel to the input shaft to which engine torque is transmitted directly through an output gear fixedly mounted on the engine input shaft and through the toroidal transmission unit, is provided with a thrust generating mechanism mounted on the input shaft and pressed against a toroidal input disk for mechanically generating a axial thrust acting on the toroidal input disk. The thrust generating mechanism is located on the same side of the toroidal transmission unit as the side where the output gear is located.

9 Claims, 4 Drawing Sheets

TOROIDAL CONTINUOUSLY VARIABLE TRANSMISSION

BACKGROUND OF THE INVENTION

1. Field of the Invention

This invention concerns a toroidal type continuously variable transmission for automotive vehicles, and more particularly, to a toroidal type continuously variable transmission of a type employing a geared neutral system where a toroidal transmission unit and a planetary gear mechanism are installed in parallel with each other.

2. Description of the Related Art

Typically, toroidal type continuously variable transmissions are provided with toroidal transmission units. Such a toroidal transmission unit comprises an input disk supplied with torque from a loading cam which acts as a thrust generator, an output disk installed coaxially with the input disk, and a pair of power rollers which are in frictional contact with opposing toroidal surfaces of the input and output disks to transmit torque between the input and output disks. Each power roller is pressed between the input and output disks with thrust corresponding to the torque generated by the loading cam to continuously keep frictional contact with the toroidal surfaces. For changing the gear ratio or doing a gear shift, the power rollers are turned around the respective shafts to change frictional contact points against each disk. Such a toroidal type continuous variable transmission is disclosed, for example, in Japanese Unexamined Patent Publication No. 62-28259.

Some of the continuous variable transmissions of this type employ what is called a geared-neural system which permits removal of starting devices. The geared-neutral system is achieved by installing the toroidal transmission unit of the type described above and a planetary gear mechanism in parallel such that engine torque is transmitted to the planetary gear mechanism through two input elements, such as a carrier and a sun-gear of the planetary gear mechanism, from two paths, one including the toroidal transmission unit and the other bypassing the toroidal transmission unit, and that differential motion of the planetary gear mechanism provides an infinitely variable gear ratio.

In the geared-neutral system, both toroidal transmission unit and planetary gear mechanism are used to change the gear ratio in a low gear mode and in a reverse gear mode, and only the toroidal transmission unit is used in a high gear mode. In any one of the low gear mode and the reverse gear mode where both toroidal transmission and planetary gear mechanism are used, circulating torque is generated and transmitted from the planetary gear mechanism to the toroidal transmission unit.

One of the problems with this geared-neutral system is that it is necessary for an input shaft on which the toroidal transmission unit and planetary gear mechanism are mounted to have high rigidity or a large diameter because the circulating torque passes through the input shaft. This always leads to an increase in the radial overall size of the toroidal transmission unit itself. On the other hand, it is difficult for the toroidal transmission unit to have a high torque transmission capacity with an input shaft which is not increased in rigidity.

SUMMARY OF THE INVENTION

It is an objective of the invention to provide a toroidal type continuously variable transmission in which torque circulates from a planetary gear to a toroidal transmission unit passing through a path minimized as short as possible.

It is another object of the invention to provide a toroidal type continuously variable transmission which has a high torque transmission capacity and yields a reduction in the overall size.

The above objects are achieved by providing a continuously variable transmission, of a type having a toroidal transmission unit mounted on an input shaft through which engine torque is input to the continuously variable transmission and a planetary gear mechanism mounted on an output shaft through which torque is output from the continuously variable transmission in parallel to the input shaft, in which torque is transmitted to the planetary gear mechanism from the input shaft, on one hand, directly through a first output gear fixedly mounted on the input shaft and, on the other hand, through the toroidal transmission unit. The continuously variable transmission has thrust generating means mounted for rotation on the input shaft, more specifically on the first output gear, to mechanically generate an axial thrust against the toroidal input disk according to torque transmitted to the input shaft. The thrust generating means and the first output gear are located on the same side of the toroidal transmission unit closer to an engine.

With the continuously variable transmission of the invention, circulating torque transmitted through the input shaft is significantly reduced by a shortened path of torque from the input shaft to the toroidal transmission unit which is realized by installing both first output gear and thrust generation means on the same side of the toroidal transmission unit, especially, closer to the engine.

BRIEF DESCRIPTION OF THE DRAWINGS

The above and other objects and features of the present invention will be clearly understood from the following description with respect to the specific embodiments thereof when considered in conjunction with the accompanying drawings in which.

DETAILED DESCRIPTION OF THE SPECIFIC EMBODIMENTS

Figure 1:
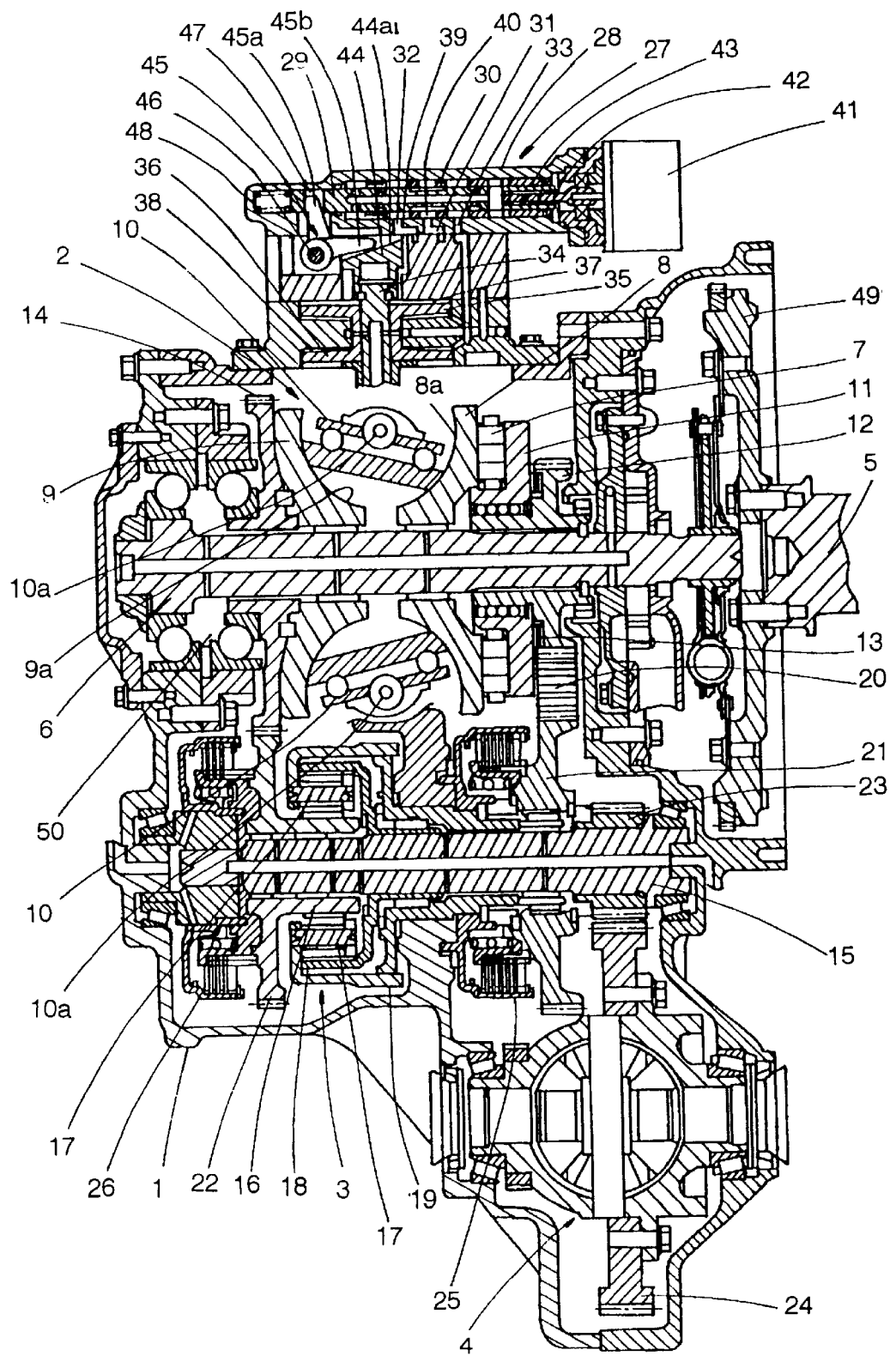
FIG. 1 is a cross-sectional view of a toroidal type continuously variable transmission in accordance with an embodiment of the invention.

Referring to the drawings in detail, and in particular, to FIG. 1 showing a toroidal type of continuously variable transmission in accordance with an embodiment of the present invention, the continuously variable transmission has a transmission casing 1 in which a toroidal transmission unit 2, a planetary gear 3, and a differential 4 are incorporated. The toroidal transmission unit 2, which is installed on a transmission input shaft 6 connected to an output shaft 5 of an engine (not shown), comprises an input disk 8 to which torque is supplied via a loading cam 7 functioning as a thrust generator, an output disk 9 arranged coaxially with the input disk 8, and one pair of power rollers 10 which are held in friction contact with opposing toroidal surfaces 8a and 9a of the input and output disks 8 and 9 to transmit torque between the input and output disks 8 and 9. These input and output disks 8 and 9 are mounted for rotation on from the transmission input shaft 6. A transmission output gear 14 that transmits output torque from the toroidal transmission unit 2 to the planetary gear mechanism 3 is mounted for rotation on the transmission input shaft 6 and attached to the output disk 9 as an integral part. The transmission input shaft 6 is provided with a flywheel 49 at its one end and supported by a thrust bearing 50 at its another end.

The loading cam 7 is located between the input disk 8 and a drive plate 11 that is fixedly mounted on a hub 12a of the transmission input shaft 6 so that it rotate together with a output gear 12. While this configuration enables torque transmission from the drive plate 11 to the input disk 8, thrust is generated correspondingly to the torque transmitted to the input disk 8 between the drive plate 11 and input disk 8 in a direction and force them to move apart from each other. The output gear 12 is operationally coupled to the input shaft 6 to transmit driving force from the input shaft 6 to the planetary gear mechanism 3. In other words, both loading cam 7 and output gear 12 are located on one side of the toroidal transmission unit 2 close to the engine to provide a shortened power transmission path from the input shaft 6 to the toroidal transmission unit 2. The drive plate 11 is forced toward the input disk 8 by a conical spring 13.

The power rollers 10 are in friction connect with the opposing toroidal surfaces 8a and 9a of the input and output disks 8 and 9, and transmit driving force from the input disk 8 to the output disk 9 by rotating around axes perpendicular to rotary shafts 10a of the disks 8 and 9, respectively. During rotation, the power rollers 10 are compressed, as will be described later, between the input and output disks 8 and 9 by the thrust which corresponds to the torque generated by the loading cam 7, which secures the friction contact of the power rollers to the toroidal surfaces 8a and 9a, assuring the transmission of applicable torque at any level.

Each power roller 10 is able to swing around the rotary shaft 10a so that the friction-contact point on the toroidal surface of each disk 8, 9 is variable, allowing a linear change in the ration of the rotational speed of the output disk 9 relative to that of the input disk 8, namely the gear ratio of the transmission. Swing motion of the power roller 10 is caused by means of hydraulic pressure control through control valves as will be described later.

Planetary gear mechanism 3 is mounted on a transmission output shaft 15 located in parallel to the transmission input shaft 6 within the transmission casing 1, and comprises a sun gear 16 at the center of the mechanism, three pinion gears 17 which rolls around the sun gear 16 while rotating on their own, a ring gear 18 which encompasses the pinion gears 17, and a carrier 19 by which the pinion gear 17 is supported. While output from the output gear 12 is entered via an idle gear 20 and an input gear 21 into the carrier 19, output from the transmission output gear 14 is transmitted to the sun gear 16 via a transmission input gear 22 formed integrally with the sun gear 16. Output from the planetary gear mechanism 3 is transmitted to the transmission output shaft 15 from the ring gear 18, and thereafter to the differential 4 via a final drive pinion 23 and a final drive gear 24 in engagement with the drive gear 23.

Figure 3:
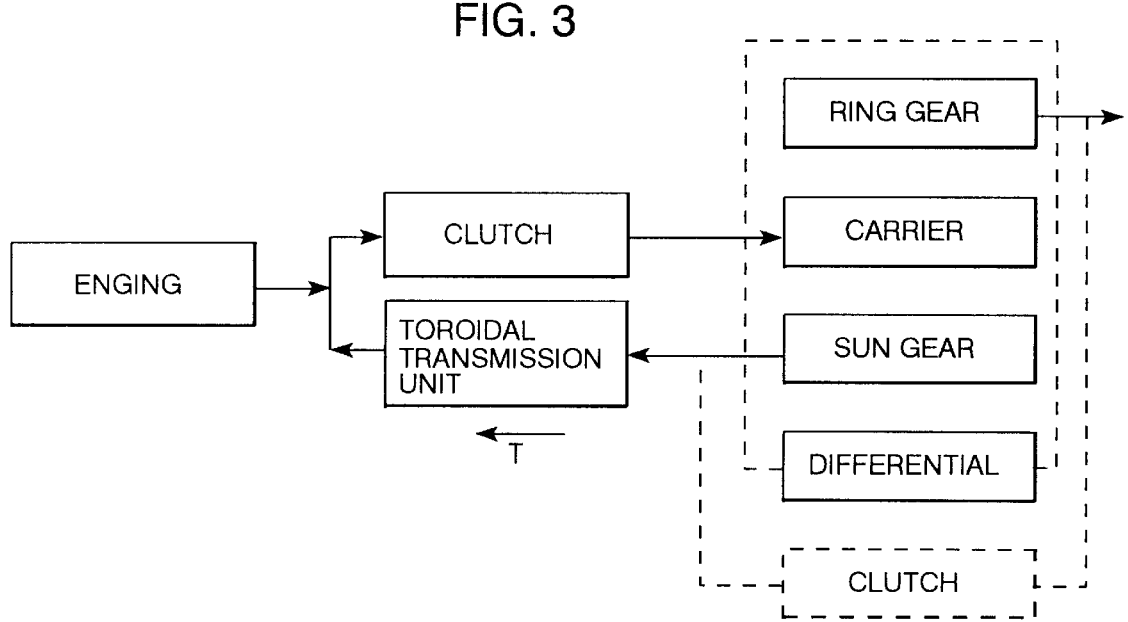
FIG. 3 is a block diagram illustrating a torque path of a torque path of the continuously variable transmission for a low gear mode.
Figure 4:
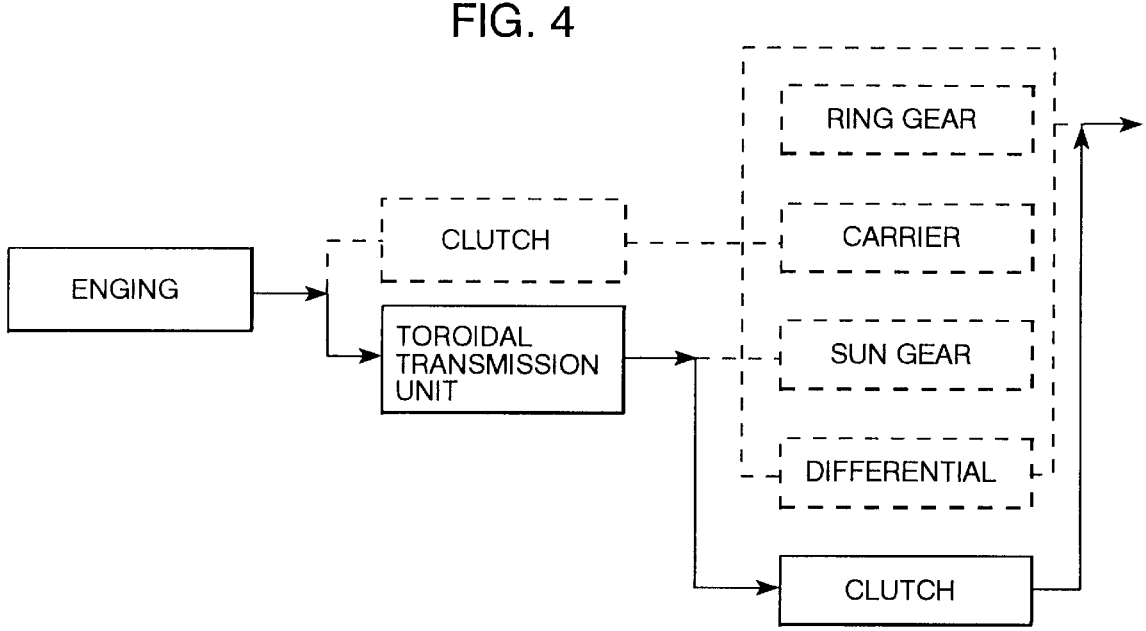
FIG. 4 is a block diagram illustrating a torque path of a torque path of the continuously variable transmission for a reverse gear mode.

Clutch 25 is located between the input gear 21 and the carrier 19 of the planetary gear mechanism, and is connected only in a low gear mode and in a reverse gear mode (i.e. the forward or reverse differential region). On the other hand, a clutch 26 is located between the transmission input gear 22 and the transmission output shaft 15, and is connected only in higher gears (i.e. the continuously variable gear shift region). That is, as shown in FIG. 3, in the low gear mode and in the reverse gear mode, while the engine output is transmitted to the carrier 19 via the output gear 12, the input gear 21, and the clutch 25 by means of connection of the clutch 25, it is also transmitted to the sun gear 16 via the toroidal transmission unit 2, the transmission output gear 14, and the transmission input gear 22. As shown in FIG. 4, in the high gear mode, the engine output is transmitted to the output shaft 15 via the toroidal transmission unit 2, the transmission output gear 14 and the clutch 26 by means of connection of the clutch 26.

Because, as described above, in the low gear mode and in the reverse gear mode, the engine output is transmitted by bypassing or passing through the toroidal transmission unit 2 to the planetary gear mechanism 3 via two input elements, namely the carrier 19 and the sun gear 16, an infinite gear ratio (reverse, stop, and forward motion) is provided by differential motion between the carrier 19 and the sun gear 16. Therefore, a starting device is unnecessary. In the high gear mode, the transmission is enabled to continuously vary the gear ratio through the toroidal transmission unit 2 by connecting the clutch 26 and, however, disconnecting the clutch 25.

The power roller 10 is actuated to swing about the rotary shaft 10a by means of pressure control through a hydraulic control valve 27. The hydraulic control valve 27 is of a three component type having a cylindrical valve body 28 affixed to the transmission casing 1, a spool 29 placed coaxially in the cylindrical valve body 28, and a sleeve 30 inserted for axial movement between these cylindrical valve body 28 and spool 29. The cylindrical valve body 28 is formed with a line pressure inlet port 31 through which the line pressure is supplied from a hydraulic pressure source and two pressure outlet ports 32 and 33 on opposite sides of the pressure inlet port 31. The pressure outlet ports 32 and 33 are connected to oil chambers 37 and 38 which receive pistons 35 and 36, respectively, for moving up and down a cam shaft 34 by which the rotary shaft 10a of each power roller 10. The hydraulic pressure fed to the pressure chamber 37 through the pressure outlet port 32 of the control valve 27 forces the cam shaft 34 upward as viewed in FIG. 1. On the other hand, the oil pressure fed to the pressure chamber 38 through the pressure outlet port of the control valve 33 moves the cam shaft 34 downward.

Sleeve 30 is formed with notches 39 and 40 for selectively bringing the pressure inlet port 31 into communication with the pressure outlet ports 32 and 33 according to axial positions of the sleeve 30. The sleeve 30 is connected by set pins to a threaded barrel 42 movable back and forth within the cylindrical valve body 28 by means of threading engagement with a screw rod 42 which is rotated by a stepping motor 41. Through this configuration, the sleeve 30 is moved back and forth within the cylindrical valve body 28 by the stepping motor 41. The spool is urged by a spring 48 to movement axially toward the stepping motor 41.

A generally V-shaped link 45 is installed between the spool 29 and a cam 44 installed at the top end of the cam shaft 34 to convert displacement of the cam 44 to axial movement of the spool 29. This link 45, which is pivotally mounted on a shaft 46 secured to the transmission casing 1, has one end 45a in contact with the cam surface 44a of the cam 44 and another other end 45b in engagement with a groove 47 formed in the mid-section of the spool 29.

The construction of the hydraulic control valve 27 and its associated mechanisms described above, in which the link 45 at the end 45b is made engage with the spool 29 at the mid-section, yields a reduction in axial dimension of the hydraulic control valve 27 as compared with the case where the link 45 engages with the end of the spool 29. In addition, an sufficient axial clearance is ensured for movement of the spool 29 without providing a large space on the side of the stepping motor 41. Resultingly, the hydraulic control valve 27 is made more compact in overall dimensions, providing more compact layout of the hydraulic control valve 27 in the transmission casing 1.

In operation of the toroidal type continuously variable transmission depicted in FIG. 1, the clutch 26 is disconnected as clutch 25 is connected in the low gear mode and in the reverse gear mode. Then, the engine output is transmitted to the planetary gear mechanism 3 via two torque paths: the path to the carrier 19 via the output gear 12, the idle gear 20, the input gear 21 and the clutch 25 in this order, and the path to the sun gear 16 via the loading cam 7, the toroidal transmission unit 2, the transmission output gear 14 and the transmission input gear 22 in this order. By the utilization of differential motion of the planetary gear mechanism 3 and in combination with the toroidal transmission unit 2, the transmission provides an infinite gear ratio.

Figure 2:
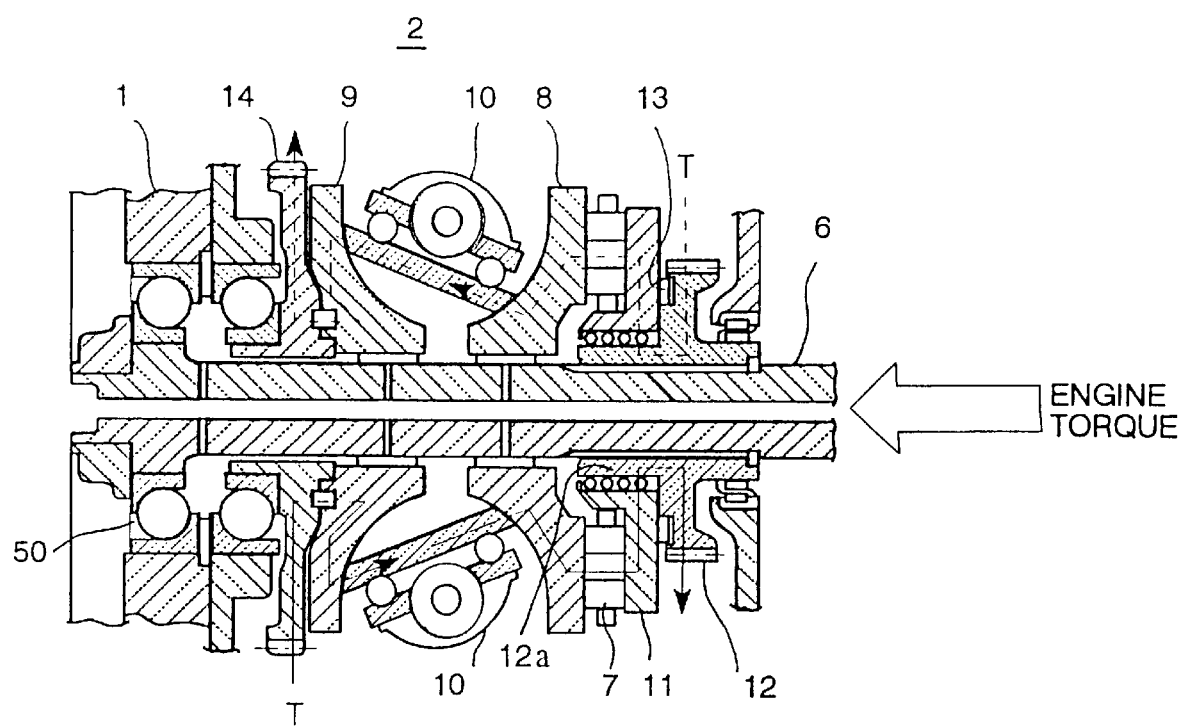
FIG. 2 is an enlarged cross-sectional view of a toroidal transmission unit installed in the continuously variable transmission of FIG. 1 in which a circulating torque path is shown.

The torque transmission path generates circulating torque T transmitted to the output gear 12 from the sun gear 16 via the transmission input gear 22, the transmission output gear 14, the output disk 9, the power roller 10, the input disk 8 and loading cam 7 in this order in the low gear mode. This circulating torque T transmitted to the out gear 12 is merged into the engine output and then to the carrier 19 of the planetary gear mechanism 3. In the reverse gear mode, circulating torque T is transmitted to the output gear 12 from the carrier 19 via the clutch 25, the input gear 21 and the idle gear 20 in this order and then, after being merged into the engine output, to the sun gear 16 via the loading cam 7, the input disk 8, the power roller 10, the output disk 9 and the transmission output gear 14 in this order as shown by broken line in FIG. 2.

Since the path of circulating torque T does not include the input shaft 6 therein, it is unnecessary for the input shaft 6 to have high rigidity or an increased diameter in order to grant a high torque transmission capacity to the toroidal transmission unit 2. The toroidal transmission unit 2 constructed as described above enables the continuously variable transmission to be made more compact. In the continuously variable transmission shown in FIGS. 1 and 2 where the loading cam 7 is mounted on the hub 12a of the output gear 12, the circulating torque T does not pass through the input shaft 6 at all. In the case where the loading cam 7 is directly mounted on the input shaft 6, while the input shaft 6 takes part in the transmission path of circulating torque T between the output gear 12 and the loading cam 7, only negligible impact is made on the input shaft 6 because of a very short distance.

Figure 5:
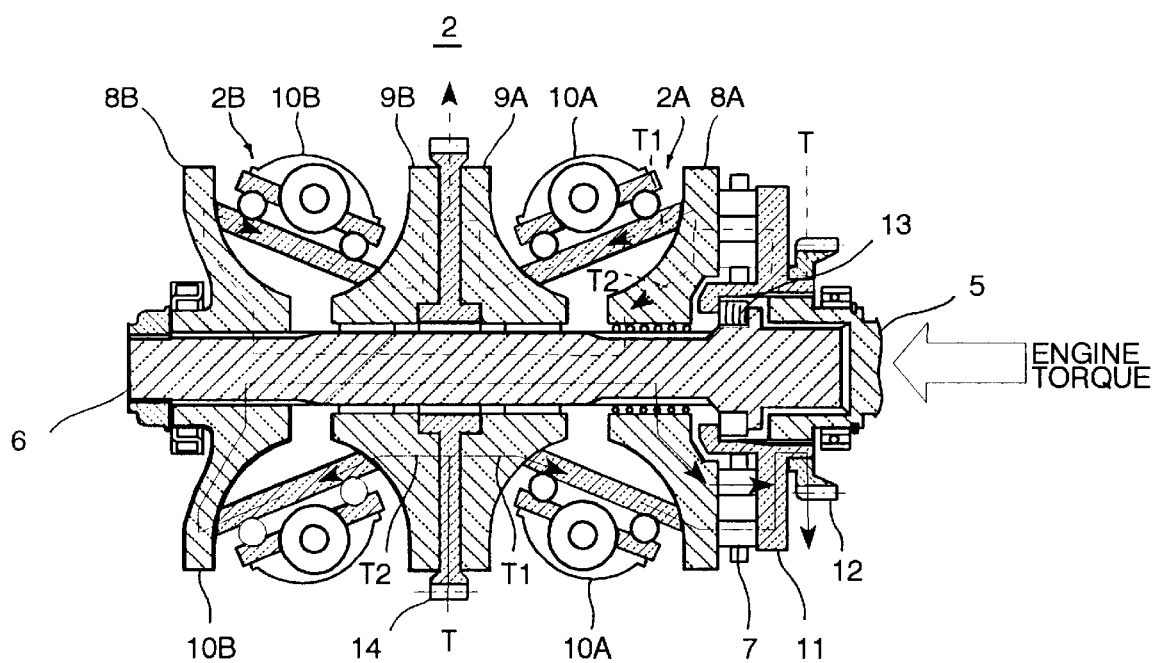
FIG. 5 is an enlarged cross-sectional view of a double-toroidal transmission unit available in the continuously variable transmission of FIG. 1 in which a circulating torque path is shown.

FIG. 5 shows a variation of the toroidal transmission unit installed in the continuously variable transmission of the invention. The toroidal transmission unit 2A is of a double-toroidal type having a first toroidal transmission unit 2A and a second toroidal transmission unit 2B. The first toroidal transmission unit 2A comprises input and output disks 8A and 9A, and a power roller 10A. Similarly, the second toroidal transmission unit 2B has input and output disks 8B and 9B, and power roller 10B. In the toroidal transmission unit 2A in the low gear mode, circulating torque T is first transmitted to the transmission output gear 14 and then divided into two parts of circulating torque T1 and T2 separately directed to the toroidal transmission unit 2A and 2B, respectively, as shown by solid line in FIG. 5. The circulating torque T1 is transmitted to the output gear 12 through a path via the output disk 9A, the power roller 10A, the input disk 8A and the loading cam 7. The circulating torque T2 is transmitted to the output gear 12 through a path via the output disk 9B, the power roller 10B, the input disk 8B, the input shaft 6, the input disk 8A and the loading cam 7. On the other hand, in the reverse gear mode, circulating torque T is first transmitted to the loading cam 7 via the output gear 12 and then divided into two parts of circulating torque T1 and T2 separately directed to the toroidal transmission unit 2A and 2B, respectively, as shown by broken line in FIG. 5. The circulating torque T1 is transmitted to the transmission output gear 14 through a path via the power roller 10A, the output disk 9A. The circulating torque T2 is transmitted to the transmission output gear 14 through a path via the input disk 8A, the input shaft 6, the input disk 8B, the power roller 10B and the output disk 9B. In both low and reverse gear modes, a half of circulating torque T passes through the input shaft 6, the impact of circulating torque T relating to the rigidity of input shaft 6 is reduced by half.

With the present invention, there is the significant benefit of being able to achieve both a high torque capacity and a reduction in device size by obtaining the maximum possible reduction in the impact of circulating torque on shaft strength. The transmission of circulating torque generated in the planetary gear mechanism through the input shaft is kept to a minimum by placing the following two components on the same side relative to the toroidal transmission: the thrust generation mechanism which is axially supported on the input shaft and which is in contact with the input disk, and which mechanically generates axial thrust against the input disk of the toroidal transmission unit; and the output gear which transmits the power output from the input shaft to the planetary gear mechanism.

With the configuration in which the thrust generating mechanism and the output gear are placed on the same side of the toroidal transmission unit closer to the engine, the twisting torque acting on the input shaft is significantly reduced by a shortened torque path from the input shaft to the toroidal transmission unit.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. In a continuously variable transmission of a type having a toroidal transmission unit mounted on an input shaft through which engine torque is transmitted to said continuously variable transmission and a planetary gear mechanism mounted on an output shaft in parallel to said input shaft to which engine torque is transmitted directly through an output gear fixedly mounted on said input shaft and through said toroidal transmission unit, the improvement comprising thrust generating means for mechanically generating an axial thrust against a toroidal input disk of said toroidal transmission unit, said thrust generating means being mounted for rotation on said input shaft on one side of said toroidal transmission unit where an output gear of said continuously variable transmission is installed.

2. A continuously variable transmission of a type having a toroidal transmission unit which comprises toroidal input and output disks and a roller disposed between the toroidal input and output disks and a planetary gear unit, which comprises:

a transmission input shaft connected an engine, said transmission input shaft mounting said toroidal transmission unit thereon;

a transmission output shaft disposed in parallel to said transmission input shaft, said transmission output shaft mounting said planetary gear unit thereon;

a first output gear secured to said transmission input shaft for transmitting engine output torque directly to said planetary gear unit;

a second output gear mounted for rotation on said transmission input shaft for transmitting engine output torque to said planetary gear unit through said toroidal transmission unit; and thrust generating means supported for rotation by said transmission input shaft for mechanically generating an axial thrust against said toroidal input and output disks and said roller according to an engine speed of rotation;

said first output gear and said thrust generating means being disposed on the same side of said toroidal transmission unit in an axial direction of said transmission input shaft.

3. The continuously variable transmission as defined in claim 2, wherein said output gear of said continuously variable transmission has a hub on which said thrust generating mean is mounted for rotation.

4. The continuously variable transmission as defined in claim 2, wherein said output gear of said continuously variable transmission and said thrust generating means are located between said toroidal transmission unit and said engine.

5. The continuously variable transmission as defined in claim 2, wherein said thrust generating means comprising a drive plate mounted on said first output gear and a loading cam for imparting a thrust against said toroidal input disk in an axial direction of said transmission input shaft following rotation of said drive plate.

6. The continuously variable transmission as defined in claim 2, wherein said first output gear has a hub on which said thrust generating means is mounted for rotation and said first output gear and said thrust generating means are located between said toroidal transmission unit and the engine.

7. A continuously variable transmission of a type having a toroidal transmission unit which comprises toroidal input and output disks and a roller disposed between the toroidal input and output disks and a planetary gear unit which comprises:

a transmission input shaft connected to an engine, said transmission input shaft, said transmission output shaft mounting said planetary gear unit thereon;

a first output gear having a hub and secured to said transmission input shaft for transmitting engine output torque directly to said planetary gear unit;

a second output gear mounted for rotation on said transmission input shaft for transmitting engine output torque to said planetary gear unit through said toroidal transmission unit; and thrust generating means mounted for rotation on said hub of said first output gear for mechanically generating an axial thrust against said toroidal input and output disks and said roller according to an engine speed of rotation;

said first output gear and said thrust generating means being disposed on the same side of said toroidal transmission unit in an axial direction of said transmission input shaft.

8. A continuously variable transmission of a type having a toroidal transmission unit which comprises toroidal input and output disks and a roller disposed between the toroidal input and output disks and a planetary gear unit, which comprises:

a transmission input shaft connected to an engine, said transmission input shaft, mounting said toroidal transmission unit thereon;

a transmission output shaft disposed in parallel to said transmission input shaft, said transmission output shaft mounting said planetary gear unit thereon;

a first output gear secured to said transmission input shaft for transmitting engine output torque directly to said planetary gear unit;

a second output gear mounted for rotation on said transmission input shaft for transmitting engine output torque to said planetary gear unit through said toroidal transmission unit; and thrust generating means mounted for rotation on said hub of said output gear for mechanically generating an axial thrust against said toroidal input and output disks and said roller according to an engine speed of rotation;

said first output gear and said thrust generating means being disposed between said toroidal transmission and said engine.

9. A continuously variable transmission of a type having a toroidal transmission unit which comprises toroidal input and output disks and a roller disposed between the toroidal input and output disks and a planetary gear unit, which comprises:

a transmission input shaft connected to an engine, said transmission input shaft mounting said toroidal transmission unit thereon;

a transmission output shaft disposed in parallel to said transmission input shaft, said transmission output shaft mounting said planetary gear unit thereon;

a first output gear secured to said transmission input shaft for outputing engine output torque therethrough;

a second output gear mounted for rotation on said transmission input shaft for outputing engine output torque through said toroidal transmission unit;

a first input gear connected to a first planetary gear element and meshed with said first output gear for transmitting engine output torque directly to said planetary gear mechanism;

a second input gear connected to a second planetary gear element and meshed with said second output gear for transmitting engine output torque to said planetary gear mechanism through said toroidal transmission unit; and thrust generating means supported for rotation by said transmission input shaft for mechanically generating an axial thrust against said toroidal input and output disks and said roller according to an engine speed of rotation;

said first output gear and said thrust generating means being disposed on the same side of said toroidal transmission unit in an axial direction of said transmission input shaft.

* * * * *